United States Patent Office 2,885,333
Patented May 5, 1959

2,885,333

CONVERSION OF BIS-(NITROSOHYDROCARBONS) INTO OXIMES

Eugen Mueller, Tubingen, Horst Metzger, Ludwigshafen (Rhine), and Dorla Fries, Mannheim-Gartenstadt, Germany No Drawing. Application November 19, 1956
Serial No. 622,777

Claims priority, application Germany December 3, 1955

6 Claims. (Cl. 204—158)

This invention relates to an improved process for the production of oximes by conversion of bis-(nitrosohydrocarbons) into said oximes.

We have found that oximes can be prepared in an advantageous manner by allowing dry hydrogen chloride or hydrogen bromide to act on secondary aliphatic or cycloaliphatic bis-(nitrosohydrocarbons) (i.e. dimeric nitrosohydrocarbons) in the presence of inert solvents or diluents and preferably while being irradiated.

Suitable bis-(nitrosohydrocarbons) are, inter alia, the dimeric mononitroso derivatives of cyclopentane, cyclohexane, cycloheptane, cyclooctane or cyclodecane and their homologues as well as of the open-chain paraffin hydrocarbons containing from three up to about thirty carbon atoms, such as pentane, octane or tetradecane. These are obtained by methods to which no claim here is made, for example by allowing a mixture of nitrogen monoxide and chlorine which contains the nitrogen monoxide in an excess as compared with the chlorine to act during irradiation on saturated aliphatic or cycloaliphatic hydrocarbons, or by dehydrogenating N-alkyl- or N-cycloalkylhydroxylamines.

As inert diluents, i.e. liquids which do not react with the components of the reaction mixture, there may be used saturated hydrocarbons, for example those corresponding to the bis-nitroso compounds, or halogenated hydrocarbons, such as carbon tetrachloride or chloroform. There can be used a saturated solution of the bis-(nitrosohydrocarbon) in said diluents or a diluted one; for instance a 0.1 up to about 10 percent solution.

The rearrangement to form the oximes takes place even by leading dry hydrogen chloride or hydrogen bromide into the solutions of the bis-(nitrosohydrocarbons) at room or moderately elevated temperature, for instance at from about +15° C. up to about +60° C. It is preferred to saturate the solution with hydrogen chloride or bromide. The hydrochlorides or hydrobromides of the oximes are in general precipitated thereby in crystalline form in a very pure state and in very good yields. The conversion proceeds especially rapidly when the reaction mixture is irradiated simultaneously with the introduction of the hydrogen halide or subsequently. As the source of light there may serve for example diffuse daylight, sunlight or the light of incandescent lamps, fluorescent tubes, hydrogen or mercury lamps. The most advantageous wave-lengths, temperatures and concentration conditions may readily be ascertained by preliminary experiment.

It is already known that primary and secondary aliphatic bis-(nitroso compounds) can be converted in alkaline medium into oximes (see Liebigs Ann. Chem. 263 (1891), page 214 and Ber. deutsch. Chem Ges. 30 (1897), page 1899). The yields of pure oxime obtained thereby are unsatisfactory by reason of side reactions. The process of the present invention, on the other hand, gives very good yields of very pure oximes or their hydrochlorides or hydrobromides from which the pure oximes may be recovered readily by known methods.

It is also already known that primary aliphatic bis-(nitrosohydrocarbons) with concentrated aqueous hyrochloric acid gradually split up into the corresponding aldehydes and hydroxyammonium chloride, whereas bis-(omega-nitrosotoluene) forms hydrazine derivatives with hydrogen chloride (Liebigs Ann. Chem. 263 (1891), page 213 or 323 (1902), page 272). Having regard to this fact, it is surprising that secondary aliphatic and cycloaliphatic bis-(nitrosohydrocarbons) are converted by dry hydrogen halide into pure oximes or the hydrohalides.

The present invention thus provides a new and very advantageous method for the production of oximes which are known to be valuable intermediate products for polyamides.

The following examples will further illustrate this invention but the invention is not restricted thereto.

*Example 1*

A solution of 5.0 grams of bis-(nitrosocyclohexane) in 300 ccs. of cyclohexane is saturated with dry hydrogen chloride and allowed to stand in the dark. After two days, the hygroscopic crystal mass of cyclohexanone oxime hydrochloride which has been formed is filtered off by suction and dissolved in water and from the resultant solution the cyclohexanone oxime is precipitated by the addition of 2-normal caustic soda solution until the pH is 4, and filtered off by suction. A further amount of cyclohexanone oxime is obtained by extracting the mother liquor with ether. The oxime, without further purification, has a melting point of 89° C. to 90° C. The yield amounts to 4.4 grams, or 88 percent of the theoretical yield. A solution of bis-(nitrosocyclohexane) in cyclohexane without the addition of hydrogen chloride remains unchanged for weeks.

*Example 2*

Dry hydrogen chloride is led into a solution of 5.0 grams of bis-(nitrosocyclooctane) in 300 ccs. of cyclooctane until it is saturatde and the solution is allowed to stand in the dark. After two days, the hygroscopic crystals of cyclooctanone oxime hydrochloride which have been found are filtered off by suction, dissolved in a little water and neutralized with 2-normal caustic soda solution while stirring and cooling with ice. The precipitated cyclooctanone oxime is filtered off by suction and dried. The yield amounts to 47 grams, or 94 percent of the theoretical yield. The oxime, without further purification, has the melting point 42° C. to 43° C.

*Example 3*

A solution of 6.0 grams of bis-(4-nitroso-normal-heptane) in 300 ccs. of normal-heptane is saturated with hydrogen chloride. The solution is allowed to stand in the dark and after two days the oxime hydrochloride which has been deposited as an oil at the bottom of the reaction vessel is separated off. By dissolving it in water and neutralizing with 2-normal caustic soda solution there are obtained therefrom 4.8 grams (80 percent of the theoretical yield) of normal-heptanone-(4)-oxime of the boiling point 93° C. to 94° C. at 15 Torr.; $n_D^{20}=1.4486$.

*Example 4*

Dry hydrogen chloride is led into a solution of 5.0 grams of bis-(nitrosocyclohexane) in 300 ccs. of cyclohexane while stirring and with simultaneous irradiation of the reaction material with a UV-immersion lamp, so that the solution is continually saturated with hydrogen chloride. After about 20 minutes oil drops separate. After 3 hours the reaction is discontinued, the cyclohexanone oxime hydrochloride which has separated as an oil is removed, dissolved in water and the solution neutralized with dilute caustic soda solution to pH=4. The cyclohexanone oxime thus precipitated is completely colorless and melts at 88° C. to 89° C. By extracting the cyclohexane mother liquor with water, neutralizing and extracting the solution, and also by extracting with ether the mother liquor remaining after filtering off the oxime, further amounts of cyclohexanone oxime are obtained. The total yield amounts to 4.5 grams, or 90 percent of the theoretical yield.

*Example 5*

5.0 grams of bis-(nitrosocyclooctane) are dissolved in 500 ccs. of cyclooctane and during irradiation with a UV-immersion lamp treated with dry hydrogen chloride so that the reaction mixture is continually saturated with hydrogen chloride. After about 20 minutes the cyclooctanone oxime hydrochloride separates as an oil. After 3 hours, this oil is separated from the cyclooctane, dissolved in a little water and the solution neutralized with 2-normal caustic soda solution while cooling with ice and stirring. The cyclooctanone oxime obtained in beautiful colorless crystals melts without further purification at 41° to 42° C. The yield amounts to 4.5 grams, or 90 percent of the theoretical yield.

We claim:

1. An improved process for the production of an oxime by conversion of a bis-(nitrosohydrocarbon) which comprises saturating at a temperature not in excess of 60° C. a solution of a bis-(nitrosohydrocarbon) selected from the class consisting of dimeric secondary mono-nitroso-derivatives of saturated aliphatic and cycloaliphatic hydrocarbons in an inert solvent with a dry hydrogen halide selected from the class consisting of hydrogen chloride and bromide, and neutralizing the oxime hydrohalide formed.

2. An improved process for the production of an oxime by conversion of a bis-(nitrosohydrocarbon) which comprises saturating at a temperature not in excess of 60° C. a solution of a bis-(nitrosohydrocarbon) selected from the class consisting of dimeric secondary mono-nitroso-derivatives of saturated aliphatic and cycloaliphatic hydrocarbons in an inert solvent with a dry hydrogen halide selected from the class consisting of hydrogen chloride and bromide while irradiating with light and neutralizing the oxime hydrohalide formed.

3. An improved process for the production of cyclohexanone oxime which comprises saturating at a temperature not in excess of 60° C. a solution of bis-(nitrosocyclohexane) in an inert solvent with a dry hydrogen halide selected from the class consisting of hydrogen chloride and bromide, and neutralizing the oxime hydrohalide formed.

4. An improved process for the production of cyclooctanone oxime which comprises saturating at a temperature not in excess of 60° C. a solution of bis-(nitrosocyclooctane) in cyclo-octane with dry hydrogen chloride and neutralizing the oxime hydrohalide formed.

5. An improved process for the production of normal-heptanone-(4)-oxime which comprises saturating at a temperature not in excess of 60° C. a solution of bis-(4-nitroso-normal-heptane) in normal-heptane with dry hydrogen chloride and neutralizing the oxime hydrohalide formed.

6. An improved process for the production of cyclohexanone oxime which comprises saturating at a temperature not in excess of 60° C. a solution of bis-(nitrosocyclohexane) in cyclohexane while irradiating with the ligt of a UV-immersion lamp with dry hydrogen chloride and neutralizing the oxime hydrohalide formed.

References Cited in the file of this patent

UNITED STATES PATENTS 2,719,116   Brown _____ Sept. 27, 1955

FOREIGN PATENTS 1,123,978   France _____ June 18, 1956

OTHER REFERENCES

Bamberger: Ber. Deut. Chem., 44, 3066–72 (1911).
Muller et al.: Berichte der Deut. Chem., vol. 87, pp. 1282–93 (1954).
Muller et al.: Berichte der Deut. Chem., vol. 87, pp. 1449–60 (1954).
Muller et al.: Berichte der Deut. Chem., vol. 88, pp. 165–77 (1955).
Muller et al.: Berichte der Deut. Chem., vol. 88, pp. 1891–1905 (1955).
Muller et al.: Berichte der Deut. Chem., vol. 89, pp. 397–406 (1956).